(12) United States Patent
Wagner (10) Patent No.: US 9,621,051 B2
(45) Date of Patent: Apr. 11, 2017

(54) CONTROL MODES FOR RESONANT DC-TO-DC-CONVERTER

(71) Applicant: KONINKLIJKE PHILIPS N.V., Eindhoven (NL)

(72) Inventor: Bernhard Wagner, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 172 days.

(21) Appl. No.: 14/400,587

(22) PCT Filed: Jun. 13, 2013

(86) PCT No.: PCT/IB2013/054839
§ 371 (c)(1),
(2) Date: Nov. 12, 2014

(87) PCT Pub. No.: WO2013/190432
PCT Pub. Date: Dec. 27, 2013

(65) Prior Publication Data
US 2015/0155788 A1  Jun. 4, 2015

Related U.S. Application Data

(60) Provisional application No. 61/661,463, filed on Jun. 19, 2012.

(51) Int. Cl.
*H02M 3/335* (2006.01)
*H02M 3/337* (2006.01)
*H02M 1/00* (2006.01)

(52) U.S. Cl.
CPC ..... *H02M 3/33507* (2013.01); *H02M 3/3376* (2013.01); *H02M 2001/0058* (2013.01); *Y02B 70/1433* (2013.01); *Y02B 70/1491* (2013.01)

(58) Field of Classification Search
CPC . H02M 2001/0058; H02M 2007/4815; H02M 7/4826; H02M 2007/4818;
(Continued)

(56) References Cited

U.S. PATENT DOCUMENTS

| 6,560,127 B2 * | 5/2003 | Wittenbreder, Jr. .......... H02M 3/33576 363/17 |
| 7,948,774 B2 * | 5/2011 | Scheel .................. H02M 3/158 323/235 |
| 2011/0194206 A1 | 8/2011 | Sase et al. |

FOREIGN PATENT DOCUMENTS

| EP | 1120892 A2 | 8/2001 |
| WO | 2004064237 A1 | 7/2004 |
| WO | 2006114719 A1 | 11/2006 |

* cited by examiner

*Primary Examiner* — Fred E Finch, III
*Assistant Examiner* — Rafael O De Leon Domenech (57) ABSTRACT

An electrical power converter comprises an inverter with semiconductor switches, a resonant circuit coupled with the inverter, and a controller for switching the semiconductor switches of the inverter to switching states. The controller is adapted for periodically switching the inverter between switching states, such that a periodic resonant current is generated in the resonant circuit, for synchronizing switching events of the switching states with the periodic resonant current, such that a switching state is applied to the inverter at a time point associated with a specific periodic point of the periodic resonant current, and for applying the switching states such that an overall power feed backward from the resonant circuit to an input of the inverter is balanced with an overall power feed forward from the input of the inverter to the resonant circuit.

10 Claims, 5 Drawing Sheets

CONTROL MODES FOR RESONANT DC-TO-DC-CONVERTER

FIELD OF THE INVENTION

The invention relates to an electrical power converter, a DC-to-DC-converter, an X-ray device and a method for controlling an inverter.

BACKGROUND OF THE INVENTION

In X-ray generation devices, a DC-to-DC converter may be used for transforming a low DC input voltage (for example 400 V into a high DC output voltage (up to 160 kV). For example, such a DC-to-DC converter may comprise a controllable inverter for generating an AC voltage with variable frequency, a transformer for generating a high AC voltage, and a rectifier for generating the high DC output voltage, which may supply an X-ray tube.

Power inverters for X-ray generation frequently drive resonant load circuits. In particular, medical diagnostic applications may need to control the output power to the X-ray tube in an extremely wide range from quasi no-load to maximum power. One or more switching events of the power semiconductor switches of the inverter shall be controlled accordingly in any half cycle of the resonant current oscillation.

For example, WO 2006/114719 A1 shows DC-to-DC converter with a full-bridge inverter connected to a resonant circuit. Three control modes are defined, which are used for controlling the output power.

However, especially for very low tube output power (e. g. no-load, closed grid of the X-ray tube) the controller may generate a scattering effect which means strongly dithering amplitudes of the resonant current. The result may be a significant low-frequency ripple on the high voltage, which is undesired.

SUMMARY OF THE INVENTION

It may be object of the invention to provide a DC-to-DC converter with a broad power output range and smooth output voltage.

This object is achieved by the subject-matter of the independent claims. Further exemplary embodiments are evident from the dependent claims and the following description.

An aspect of the invention relates to an electrical power converter.

According to an embodiment of the invention, the electrical power converter comprises an inverter with semiconductor switches, a resonant circuit coupled with the inverter, and a controller for switching the semiconductor switches of the inverter to switching states. The controller is adapted for periodically switching the inverter between switching states, such that a periodic resonant current is generated in the resonant circuit. The switching states may comprise a free-wheeling state for short-circuiting the resonant circuit. The controller is adapted for synchronizing switching events of the switching states with the periodic resonant current, such that a switching state is applied to the inverter at a time point associated with a specific periodic point of the periodic resonant current.

In such a way, the output power of the electrical power converter may be controlled.

According to an embodiment of the invention, the controller is adapted for applying the switching states such that an overall power feed backward from the resonant (load) circuit to the DC link input source of the inverter is (nearly) balanced with an overall power feed forward from the DC link input source of the inverter to the resonant load circuit. In this context, "balanced" may mean that the feed backward power is nearly as big as the feed forward power and/or that the two powers nearly cancel each other. In such a way, only a small total amount of power may be transferred to or from the resonant circuit.

It may be seen as a basic idea of the invention, that the feed forward power and the feed backward power are well balanced by the application of specific switching modes. The switching modes may only feed a smaller amount of real power to the resonant load circuit. Because low output power means operation with low current amplitudes, it is not necessary anymore to stick to a zero-current switching condition as described in WO 2006/114719 A1. The operation modes may smooth the envelope shape of the resonant current, and may reduce the ripple of the high DC output voltage.

For example, in a low power mode, a zero crossing of the resonant current as specific periodic point is determined, the inverter is switched to a power forward state or to a power backward state at a predefined first time period before the zero crossing, and the inverter is switched to a free-wheeling switching state at predefined second time period after the zero crossing.

For example, in a peak current mode, a peak of the resonant current is determined as specific periodic point, and the inverter is switched to a power forward state or a power backward state at the determined peak of the resonant current.

Further aspects of the invention relate to a DC-to-DC converter and an X-ray device comprising such an electrical power converter.

A further aspect of the invention relates to a method for controlling an inverter. It has to be understood that features of the method as described in the above and in the following may be features of the electrical power converter, the DC-to-DC converter and the X-ray device as described in the above and in the following.

According to an embodiment of the invention, the method comprises the steps of: periodically switching the inverter between switching states, such that a periodic resonant current is generated in a resonant circuit coupled to the inverter; synchronizing switching events of the switching states with the periodic resonant current, such that a switching state is applied to the inverter at a time point associated with a specific periodic point of the periodic resonant current.

According to an embodiment of the invention, the method comprises the step of: applying the switching states such that an overall power feed backward from the resonant circuit to an input of the inverter is balanced with an overall power feed forward from the input of the inverter to the resonant circuit.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

In principle, identical parts are provided with the same reference symbols in the figures.

DETAILED DESCRIPTION OF EMBODIMENTS

Figure 1:
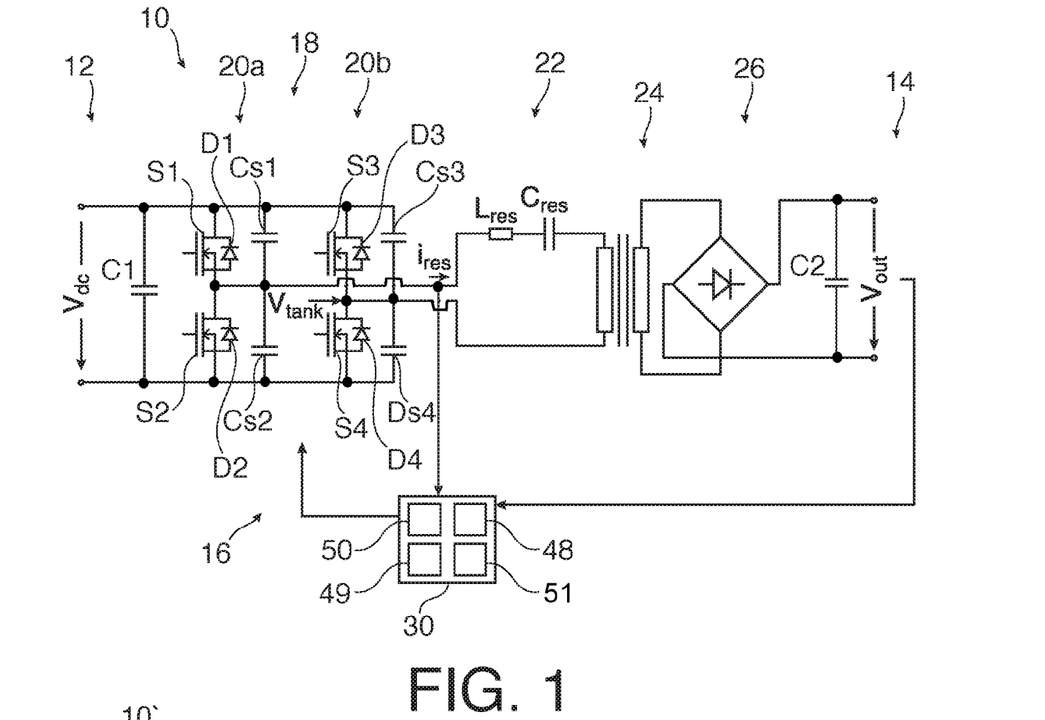
FIG. 1 shows a circuit diagram of a DC-to-DC converter according to an embodiment of the invention.

FIG. 1 shows a DC-to-DC converter 10 with an input connection 12 to a DC source, with a DC input voltage $V_{dc}$, and an output connection 14 for a DC load providing a DC output voltage $V_{out}$.

The DC-to-DC converter 10 comprises a resonant power converter 16, which is connected via a DC link capacitor C1 to the input connection 12.

The resonant converter 16 comprises a full-bridge inverter 18 comprising two half-bridges 20a, 20b connected in parallel to the capacitor C1 and to the input connection 12. Each half-bridge 20a, 20b comprises an upper and a lower branch connected in series. For example, the upper branch of the half-bridge 20a comprises a semiconductor switch S1, a free-wheeling diode D1 and a snubber capacitor Cs1 connected in parallel. The other branches analogously comprise semiconductor switches S2, S3, S4, free-wheeling diodes D2, D3, D4, and snubber capacitors Cs2, Cs3, Cs4.

According to an embodiment of the invention, the electrical power converter 16 comprises an inverter 18 with semiconductor switches S1, S2, S3, S4, and a resonant circuit 22 coupled with the inverter 18.

According to an embodiment of the invention, the inverter 18 is a full-bridge inverter, which comprises two half-bridges 20a, 20b connected in parallel to a DC link input source 12.

According to an embodiment of the invention, each half-bridge 20a, 20b comprises two branches, each branch x=1 . . . 4 having a semiconductor switch Sx, a free-wheeling diode Dx and a snubber capacitor Csx connected in parallel. For example, the upper branch of half-bridge 20a comprises a semiconductor switch S1, a free-wheeling diode D1 and a snubber capacitor Cs1.

A resonant circuit 22 is connected between the upper and lower branches of the half-bridges 20a, 20b.

According to an embodiment of the invention, the resonant circuit 22 comprises an inductivity $L_{res}$, a capacity $C_{res}$ and the primary winding of a transformer 24, which are connected in series. Also other configurations of series parallel resonant load circuits can be operated by the control schemes of this invention.

According to an embodiment of the invention, the resonant circuit 22 comprises an inductor $L_{res}$ and a capacitor $C_{res}$ connected in series.

According to an embodiment of the invention, one or more primary windings of a transformer 24 are part of an inductivity of the resonant circuit 22. The leakage inductance of the primary winding of the transformer may contribute to the total series inductance of the resonant load circuit 22.

The secondary winding of the transformer 24 is connected to a rectifier topology 26 which provides the DC output voltage $V_{out}$ for the output connection 14.

According to an embodiment of the invention, the rectifier 26 may comprise a full bridge rectifier 26 that comprises four branches of diodes. Each rectifier diode may represent a number of diode devices which are connected in series in order to create a high blocking voltage.

According to an embodiment of the invention, the DC-to-DC-converter 10 comprises a power converter 16, a transformer 24 for generating a high AC voltage from an AC voltage in the resonant circuit, and a rectifier 26 for generating a high DC voltage $V_{out}$ from the high AC voltage from the transformer.

A smoothing capacitor C2 is connected in parallel to the output connection 14.

A controller 30 of the DC-to-DC converter 10 and in particular for the inverter 16 is measuring the current $i_{res}$ in the resonant circuit 22 and/or voltage $V_{tank}$ at the output of the inverter 18 and determines a switching schema for the semiconductor switches S1, S2, S3, S4 of the inverter 16. A target output power of the power converter may be an input parameter for the controller 30, and the switching schema may be determined such that the real output power of the DC-to-DC converter 10 matches the target output power.

According to an embodiment of the invention, the controller 30 is adapted for measuring the resonant current $i_{res}$ in the resonant circuit 22.

Figure 2:
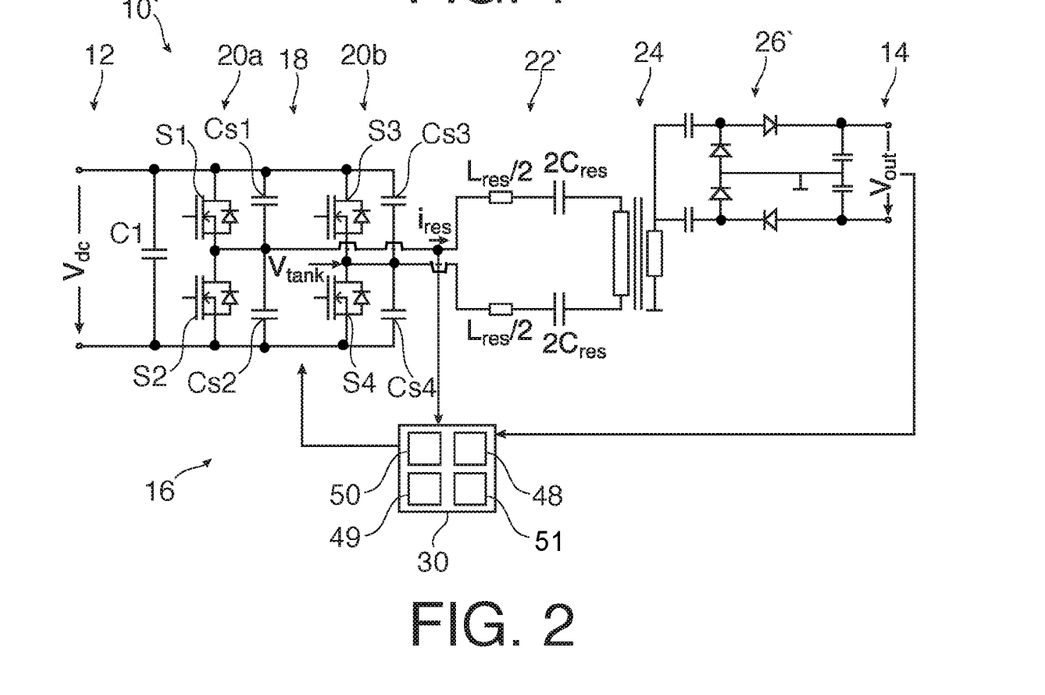
FIG. 2 shows a circuit diagram of a DC-to-DC converter according to a further embodiment of the invention.

FIG. 2 shows a further embodiment a DC-to-DC converter 10' that differs from the DC-to-DC converter 10 of FIG. 1 in the resonant circuit 22' and the rectifier topology 26'.

The resonant circuit 22' is symetrical with respect to the primary winding of the transformer 24 and comprises two inductors $L_{res}/2$ and two capacitors $2C_{res}$.

The high voltage rectifier 26' comprises a voltage multiplier topology, for example according to Cockcroft, Walton, Greinacher or Delon.

Figure 3:
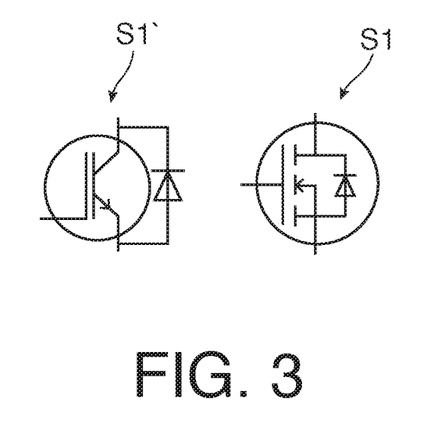
FIG. 3 shows a schematic diagram with semiconductor switches according to an embodiment of the invention.

FIG. 3 shows embodiments of switching elements or semiconductor switches that may be used for the inverter 18. In the inverter 18 any device S1, S1' may be used as semiconductor switch which can be actively blocked in a forward direction but which is reverse conductive.

Figure 4:
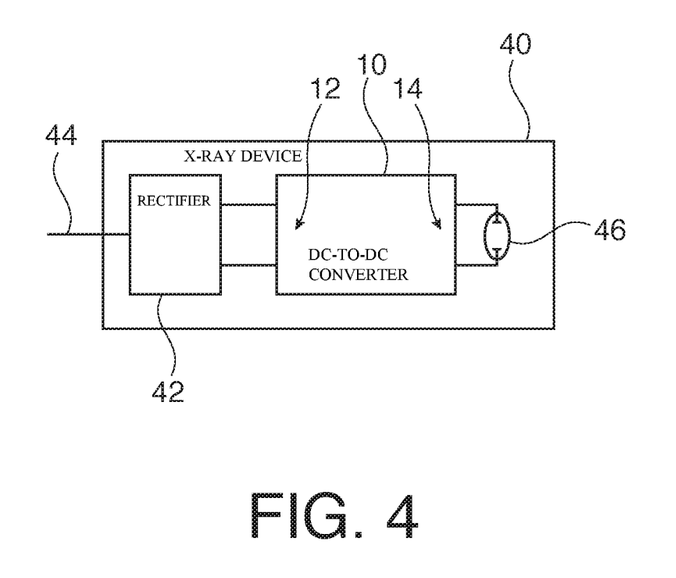
FIG. 4 shows a schematic diagram of an X-ray device according to an embodiment of the invention.

For example, the switch S1 (or all other switches) may comprise a MOSFET which is reverse conductive due to their structure. As an alternative for one or all switches, the switch S1' comprises an IGBT module including one or more anti-parallel (free-wheeling) diodes. Furthermore, SiC-devices may be applied as switch. As an application of the DC-to-DC converter 10, FIG. 4 shows an X-ray device 40 comprising the DC-to-DC converter 10. For example, the X-ray device 40 may be a CT (computer tomograph) or any other X-ray system for medical purpose.

The input connection 12 of the DC-to-DC converter is supplied by a rectifier 42 connected with an electrical power grid 44 and providing the input voltage $V_{dc}$. The output connection 14 is connected with a load comprising an X-ray tube 46.

According to an embodiment of the invention, the X-ray device 40 comprises the DC-to-DC converter 10 and an X-ray tube 46 supplied with the high DC voltage $V_{out}$.

Figure 5:
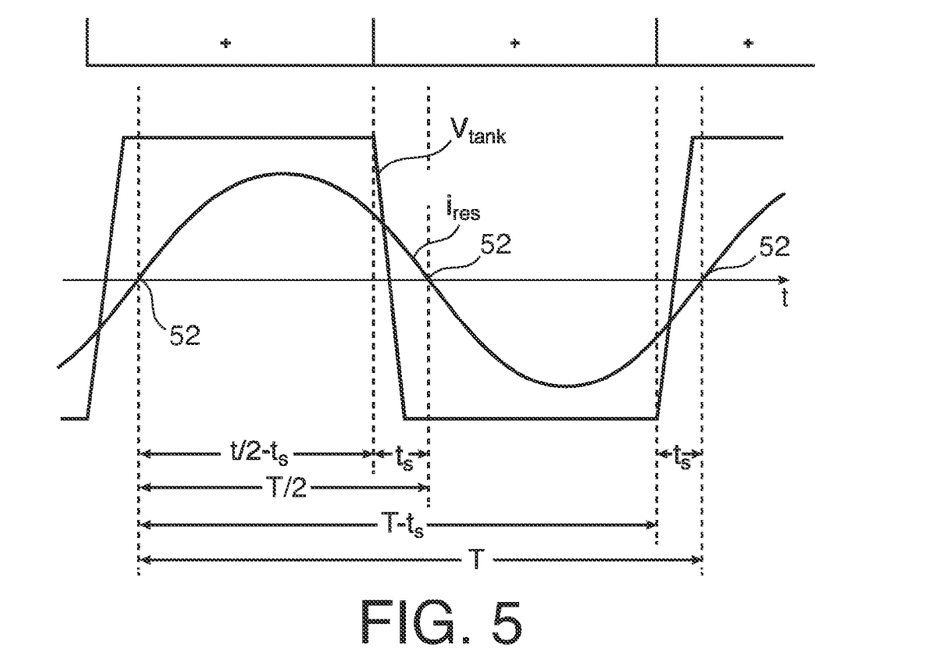
FIG. 5 shows a diagram indicating a switching mode for a controller according to an embodiment of the invention.

FIG. 5 shows a diagram with the current $i_{res}$ in the resonant circuit 22 and/or voltage $V_{tank}$ at the output of the inverter 18 over the time t in a specific switching mode of the controller 30. The resonant current $i_{res}$ is controlled such that a periodic current is generated in the resonant circuit 22.

Furthermore, FIG. 5 shows inverter commands ("+") and time periods used for generating the switching commands of the inverter 18. There are three different inverter commands or switching states "+", "0", "−", which will be explained below. The current $i_{res}$ has a period length T and a half-cycle length of T/2.

The controller 30 may comprise a phase angle encoder 48 or phase angle module 48, which, for example, is adapted for determining the zero crossing 52 of the resonant current $i_{res}$ and for determining a switching time or switching event of the inverter 18, which may be based on the lead time $t_s$ before zero crossing of the resonant current $i_{res}$. In FIG. 5, the semiconductor switches S1, S2, S3, S4 are switched to new switching states (i. e. opened or closed) at T/2−$t_s$ and at T−$t_s$.

The switching states of the semiconductor switches S1, S2, S3, S4 may be determined by a switching module 50 of the controller 30.

The switching module 50 may be triggered by a zero current detection module 49, which is adapted for detecting a zero crossing of the resonant current $i_{res}$, and a lag-time module 51, which is adapted to generate a delay time for delaying the switching module 50.

According to an embodiment of the invention, the electrical power converter 16 comprises a controller 30 for switching the semiconductor switches S1, S2, S3, S4 of the inverter 18 to switching states.

The controller 30 may be operated in different switching states or operation states.

In a (first) power forward level or state, which may be indicated by "+", the inverter 18 feeds power from the DC-link circuit into the resonant circuit 22.

In a (second) free-wheeling level or state, which may be indicated by "0", the inverter 18 does not transfer any real power.

In a (third) power backward level or state, which may be indicated by "−" the inverter 18 feeds real power from the resonant circuit 22 back to the DC-link 12.

In the first, power forward state, the inverter 18 is switched such that, most of the half-cycle of the resonant current $i_{res}$, the voltage $V_{tank}$ has the same sign or polarity as the current $i_{res}$. It has to be noted that the switching states of the switches S1 to S4 in the power forward state depend on the polarity of the resonant current $i_{res}$ at the time point at which the switching should take place.

For example, as shown in FIG. 5, during the positive half-cycle the switches S1 and S4 are turned on, while the other two switches S2, S3 are turned off, such that a positive resonant current $i_{res}$ flows directly through S1 and S4. A positive voltage $V_{tank}=V_{dc}$ is applied to the resonant circuit 22. As a result, energy is transferred from the input connection 12 into the resonant circuit 22, and the resonant current is stimulated resulting in an increase in the amplitude thereof. At the time T/2−$t_s$ (determined by the phase angle module 48) the switching states change such that S2 and S3 are turned on and are conducting while S1 and S4 are turned off, resulting in a negative voltage $V_{tank}=-V_{dc}$. This switching state nearly remains through the negative half-cycle and after the time T−$t_s$, the switching states changes back to the switching state of the positive half-cycle.

According to an embodiment of the invention, the switching states comprise a power forward state, in which a DC voltage $V_{dc}$ is applied to the resonant circuit 22, which has the same polarity as the resonant current $i_{res}$ at the switching time.

The second, free-wheeling state (not shown in FIG. 5 but indicated with "0" in FIG. 6) is achievable by four possible switching states, two for each direction (polarity) of the resonant current $i_{res}$. For example, if only switch S1 is turned on, then a positive resonant current $i_{res}$ flows through switch S1 and the conducting anti-parallel free-wheeling diode D3. The free-wheeling state may be characterized by a circular current flow. As the applied resonant voltage $V_{tank}=0$ is zero, there is no additional energy drawn from the input connection 12 into the resonant circuit 22 to either stimulate or dampen the amplitude of $i_{res}$. A similar result is obtained if only S4 is closed, in which case $i_{res}$ will flow through S4 and D2. For a negative resonant current the equivalent switching states are given by S2 turned on while S1, S4 are turned off and S3 does not care, or S3 turned on while S1, S4 are turned off and S2 does not care.

According to an embodiment of the invention, the switching states comprise a power backward state, in which a DC voltage +$V_{dc}$ is applied to the resonant circuit 22 that has the opposite polarity as the resonant current $i_{res}$ at the switching time.

In the third, power backward state, for a positive and negative resonant current $i_{res}$, switches S1, S2, S3 and S4 are turned off. A positive resonant current $i_{res}$ flows through diodes D2 and D3. The applied voltage $V_{tank}$ has an opposite polarity to that of the resonant current $i_{res}$, thus energy is transferred in the reverse direction from the resonant circuit 22 into the input connection 12. Accordingly, the resonant current $i_{res}$ will be actively damped and its amplitude significantly lowered. A negative resonant current $i_{res}$ flows through D1 and D4.

According to an embodiment of the invention, the switching states comprise a free-wheeling state for short-circuiting the resonant circuit 22.

Operation or control modes for the DC-to-DC-converter 10 may be defined with the control states, which only comprise one type of control state. In particular, the control modes may be generated by applying the switching states periodically to the inverter 18.

For example, in a full power forward mode, the inverter 18 is only switched to power forward states, in a full power backward mode, the inverter 18 is only switched to power backward states, and in a full free-wheeling mode, the inverter 18 is only switched to free-wheeling states.

In these three operation modes, each switching cycle may end and the next one may begin in the vicinity of (for example $t_s$ before) the zero crossing of the resonant current $i_{res}$, enabling both zero current and zero voltage switching such that the resulting switching losses are at a minimum.

In general, the time points of the switching, i. e. the switching events may be synchronized with periodic events or periodic points of the resonant current $i_{res}$, like the zero crossing 52.

According to an embodiment of the invention, the controller 30 is adapted for synchronizing switching events of the switching states with the periodic resonant current $i_{res}$, such that a switching state is applied to the inverter at a time point associated with a specific periodic point 52 of the periodic resonant current $i_{res}$.

In the full power forward mode shown in FIG. 5, the zero voltage switching condition is fulfilled in any operation point and the losses may be as small as possible. These two targets may be optimally reached in the mid and high power operation range. They are reached by a favorable choice of the switching event just before the zero crossing (i. e. $t_s$ before the zero crossing) of the resonant current $i_{res}$. At this time, the current amplitude is already rather small but a zero voltage switching operation may be safely be ensured.

Figure 6:
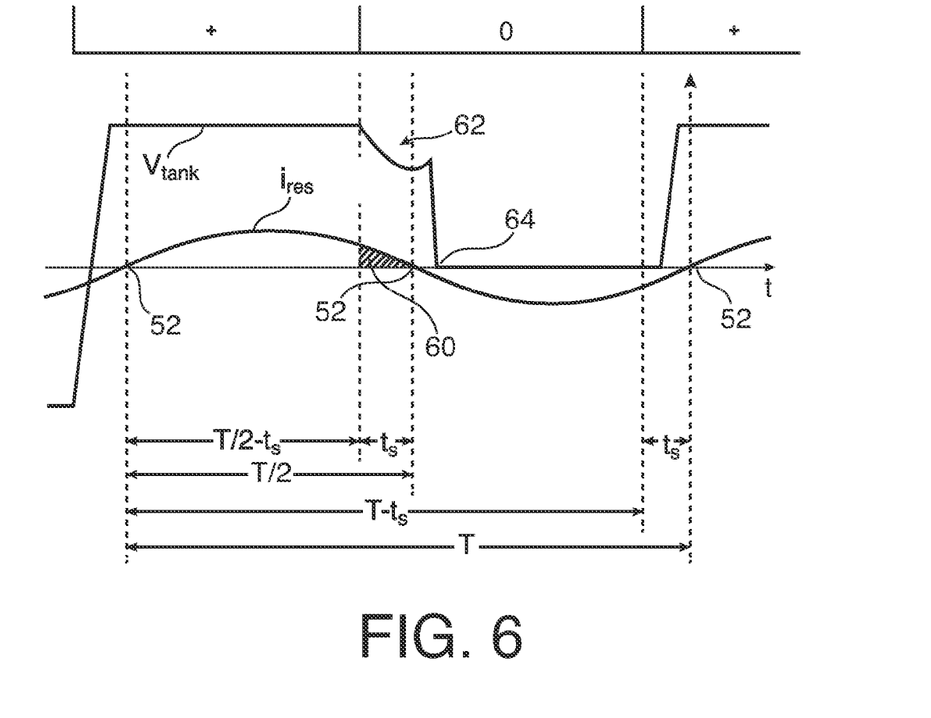
FIG. 6 shows a diagram indicating a switching mode for a controller according to an embodiment of the invention.

FIG. 6 shows a diagram similar to FIG. 5 with an operation mode of the inverter 18, in which during the positive half-cycle of the current $i_{res}$, the power forward state is applied, and during the negative half-cycle of the current $i_{res}$, the free-wheeling state is applied.

This may be used for a lower output power as in the operation mode shown in FIG. 5. However, at operation points with low output power or at quasi no-load conditions (e. g. in case of a blocking tube grid), the zero voltage switching operation may not be reliably ensured. The reason for this behavior may be residual charges of the capacitors Cs1 to Cs4. Discrete snubber capacitors may contribute to Cs1 ... Cs4 as well as the chip output capacity Coss and layer capacities of a printed circuit board. The current-time area 60 does not suffice in order to discharge the snubber capacitors Cs1 to Cs4 completely. Since the snubber capacitors do not discharge until the zero crossing is reached, the voltage $V_{tank}$ applied to the resonant circuit 22 is dropping in the range 62.

The capacitors Cs1 to Cs4 are then discharged during the following turn-on event of their parallel connected switches S1 to S4.

Consequently, the zero voltage switching condition is violated and the switching event takes place with a delay: It happens after the zero crossing of the resonant current $i_{res}$ at point 64. As a consequence, rather high losses may occur and a pulse of high electromagnetic interference due to its steep voltage change ($dV_{tank}/dt$) at 64 may occur.

Especially for very low output power (e. g. no-load, blocked grid of an X-ray tube), the controlling schemes shown in FIGS. 5 and 6 may lead to a scattering effect which means strongly dithering amplitudes of the resonant current $i_{res}$. The result may be a rather high, low frequency ripple on the high voltage $V_{out}$, which is also undesired.

In order to overcome this, two additional control or operation modes are presented that transfer a smaller amount of power into the resonant circuit 22. A low output power may mean an operation with totally low current amplitudes. Therefore, it may not be necessary to stick to the target of zero voltage switching.

In both control modes, the power flowing into the resonant circuit 22 is nearly balanced by the power leaving the resonant circuit 22.

According to an embodiment of the invention, the controller 30 is adapted for applying the switching states such that an overall power feed backward from the resonant circuit 22 to an input 12 of the inverter 18 is balanced with an overall power feed forward from the input 12 of the inverter to the resonant circuit 22.

Figure 7:
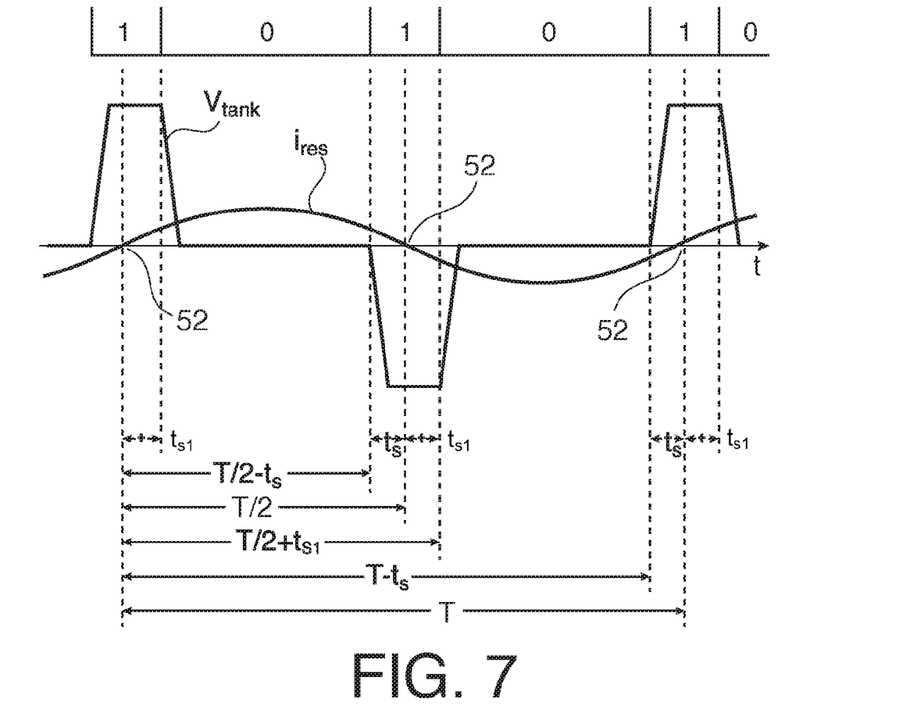
FIG. 7 shows a diagram indicating a switching mode for a controller according to an embodiment of the invention.

FIG. 7 shows a diagram similar to the diagrams of FIGS. 5 and 6 with a low power mode switching scheme. In the low power mode, the power forward state and the free-wheeling state are switched during one half-cycle.

This switching scheme is triggered by the phase angle encoder signal from the phase angle module 48. The switching sequence begins with conditions which are identical to the full power forward mode shown in FIG. 5, but ends with the conditions of the free-wheeling state. The corresponding timing conditions are $0<t_s<t_{s1}$ and $t_s+t_{s1}<T/2$.

The inverter 18 may be switched between a power transfer state and free-wheeling state during one half-cycle T/2.

For example, the phase angle module 48 determines a phase angle before the zero crossing event 52 of the resonant current $i_{res}$ and triggers the switching module 50 to switch into the power forward state "1" a first time period $t_s$ before the zero crossing 52, i. e. at $T/2-t_s$ and $T-t_s$. The switching module is triggered by a zero current detection module 49 and a lag-time module 51 (which creates a delay time $t_{s1}$) to switch into the free-wheeling state "0" a second time period $t_{s1}$ after the zero crossing 52, i. e. at $T/2+t_{s1}$ and $T+t_{s1}$. The position of the zero crossing 52 results from the shape of FIG. 7 at the upper limit of $t_s+t_{s1}=T/2$.

The time periods $t_s$ and $t_{s1}$ may be predefined fixed values or may be defined as a fraction of the period length T. The lead time $t_s$ triggers a power transfer into the resonant circuit 22. After the lag-time $t_{s1}>t_s$, the free-wheeling state may be applied in order to prevent further transfer of real power into the resonant circuit 22.

According to an embodiment of the invention, the controller 30 is adapted for determining a zero crossing 52 of the resonant current $i_{res}$ as specific periodic point.

According to an embodiment of the invention, the controller 30 is adapted for switching the inverter 18 to a power forward state or to a power backward state at a predefined first time period $t_s$ before the zero crossing 52.

According to an embodiment of the invention, the controller 30 is adapted for switching the inverter 18 to a free-wheeling switching state at a predefined second time period $t_{s1}$ after the zero crossing 52.

According to an embodiment of the invention, at least two switching events, for example a switching to the power forward state and a switching to the free-wheeling state, occur during one half-cycle of the period of the resonant current $i_{res}$.

Using the low power mode, the envelope shape of the resonant current $i_{res}$ may be smoothed. Moreover, the low power mode may reduce the ripple on the high DC voltage signal $V_{out}$. Additionally, the low power mode focuses to ensure zero voltage switching without exceptions. Steep dV/dt edges with a high state of electromagnetic interference may be avoided here.

Figure 8:
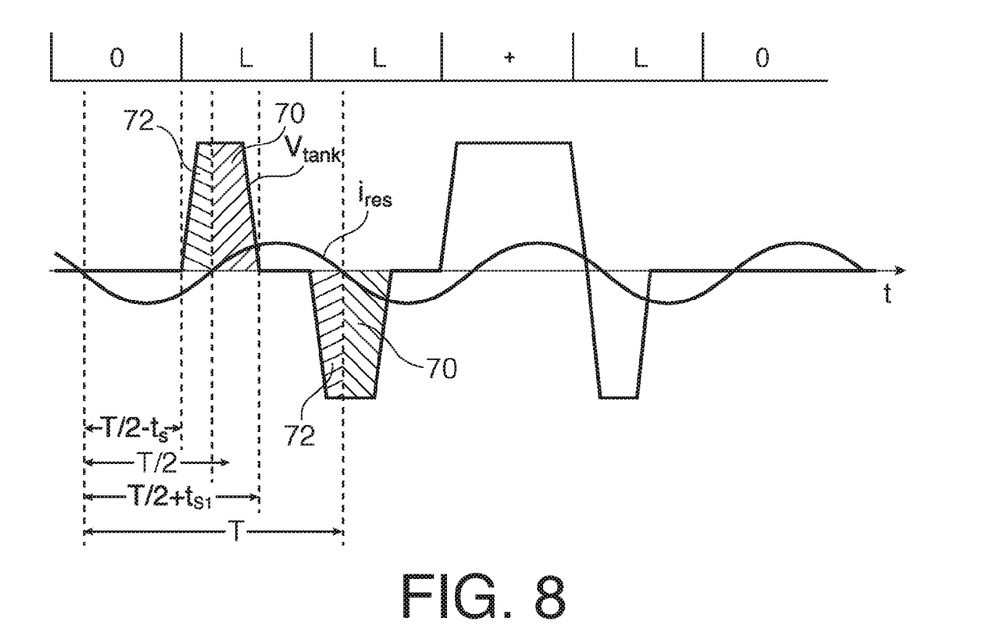
FIG. 8 shows a diagram indicating a switching sequence for a controller according to an embodiment of the invention.

FIG. 8 shows a diagram with a switching sequence comprising a low power level, a free-wheeling level and a power feed forward level.

In the low power level "L", the inverter 18 is switched according to FIG. 7. In the power feed forward level "1", the inverter 18 is switched according to FIG. 5 and in the free-wheeling level, the inverter 18 is switched as explained with respect to FIG. 6.

The power which is fed forward into the resonant circuit 22 can be calculated by the voltage-time area 70 times $i_{res}$. The power which is fed back into the DC link circuit 12 can be calculated by voltage-time area 72 times $i_{res}$. Switching as indicated in FIG. 7 and FIG. 8 in the low power level L ensures that the area 70 is (a bit) bigger than area 72. This results in a small amount of power which is fed forward during any half cycle.

Figure 9:
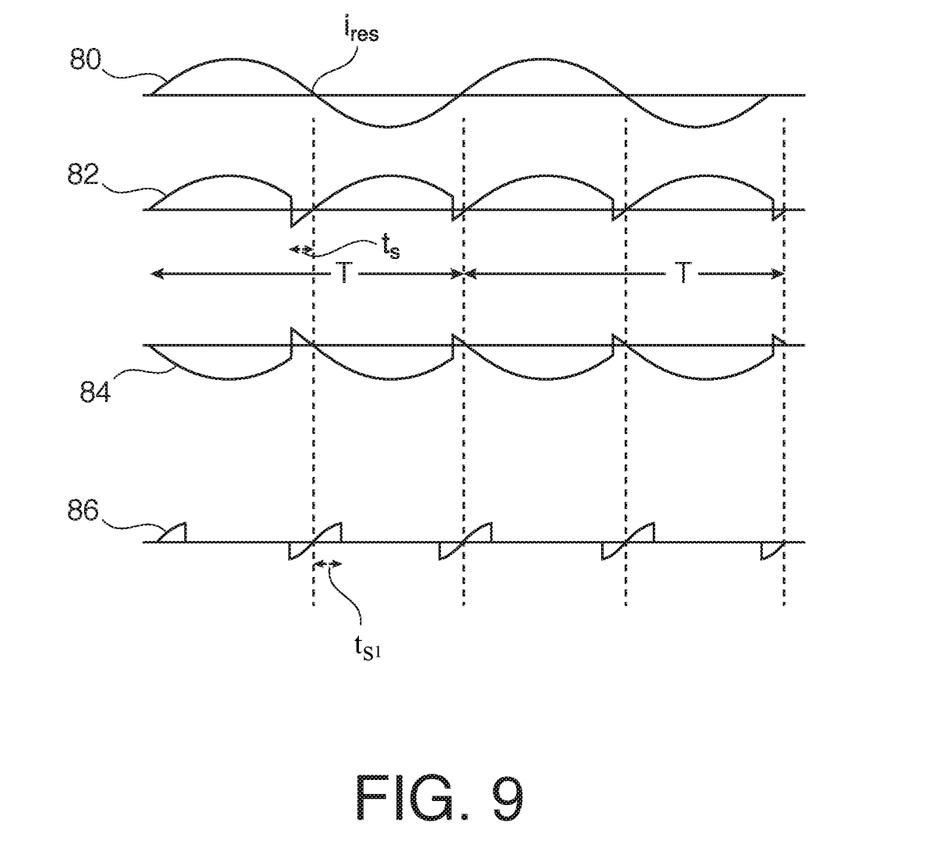
FIG. 9 shows a diagram with power transferred by a DC-to-DC converter according to an embodiment of the invention.

FIG. 9 shows a diagram indicating the amount of power which is transferred from the input connection 12, i. e. the DC link circuit, to the resonant circuit 22 over time t. The average of the transferred power or the overall of the transferred power (over one period length T) may be seen as the transfer power of the respective control mode.

Line 80 indicates a sinusoidal resonant current $i_{res}$ with period length T.

Line 82 indicates the transferred power in the full power forward mode, shown in FIG. 5. In this operation mode, the inverter 18 is always switched into the power forward state at a time period $t_s$ before the zero crossing and the overall transferred power is positive.

Line 84 indicates the transferred power in the full power backward mode. In this operation mode, the inverter 18 is always switched into the power backward state at a time period $t_s$ before the zero crossing and the overall transferred power is negative.

Line 86 indicates the transferred power in the low power mode, shown in FIG. 7. The overall transferred power is positive, but much smaller as in the full power forward mode.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. An electrical power converter, comprising:
    an inverter with semiconductor switches;
    a resonant circuit coupled with the inverter; and
    a controller for switching the semiconductor switches of the inverter to switching states,
    wherein the controller is adapted for periodically switching the inverter between switching states, such that a periodic resonant current is generated in the resonant circuit, the switching states comprising a free-wheeling state for short-circuiting the resonant circuit and at least one of:
        a power forward state, in which a DC voltage is applied to the resonant circuit, which has the same polarity as the resonant current, and
        a power backward state, in which a DC voltage is applied to the resonant circuit that has the opposite polarity as the resonant current,
    wherein the controller is adapted for determining a zero crossing of the resonant current as a specific periodic point, and wherein the controller is adapted for switching the inverter to the power forward state and to the power backward state at a predefined first time period before the zero crossing,
    wherein the controller is adapted for switching the inverter to the free-wheeling switching state at a predefined second time period after the zero crossing and the predefined second time period is a different time period than the predefined first time period,
    wherein the controller is adapted for synchronizing switching events of the switching states with the periodic resonant current, such that a switching state is applied to the inverter at a time point associated with the specific periodic point of the periodic resonant current, and
    wherein the controller is adapted during a low-power mode for applying a plurality of the switching states such that an overall power feed backward from the resonant circuit to an input of the inverter is balanced with an overall power feed forward from the input of the inverter to the resonant circuit.

2. The electrical power converter of claim 1,
    wherein at least two switching events occur during one half-cycle of the period of the resonant current.

3. The electrical power converter of claim 1,
    wherein the controller is adapted for measuring the resonant current in the resonant circuit.

4. The electrical power converter of claim 1,
    wherein the inverter is a full-bridge inverter, which comprises two half-bridges connected in parallel to a DC input, and
    wherein each half-bridge comprises two branches, each branch having a semiconductor switch, a free-wheeling diode and a snubber capacitor connected in parallel across the semiconductor switch and the free-wheeling diode.

5. The electrical power converter of claim 1,
    wherein the resonant circuit comprises an inductor and a capacitor connected in series.

6. The electrical power converter of claim 1,
    wherein a primary winding of a transformer is part of an inductivity of the resonant circuit.

7. A DC-to-DC-converter, comprising:
    a power converter according to claim 1;
    a transformer for generating a high AC voltage from an AC voltage in the resonant circuit; and
    a rectifier for generating a high DC voltage from the high AC voltage from the transformer.

8. An X-ray device, comprising:
    a DC-to-DC converter according to claim 7; and
    an X-ray tube supplied with the high DC voltage.

9. The electrical power converter of claim 1,
    wherein the predefined second time period is larger than the predefined first time period.

10. A method for controlling an inverter, the method comprising acts of:
    periodically switching the inverter between switching states, such that a periodic resonant current is generated in a resonant circuit coupled to the inverter, the switching states comprising a free-wheeling state for short-circuiting the resonant circuit;
    synchronizing switching events of the switching states with the periodic resonant current, such that a switching state is applied to the inverter at a time point associated with a specific periodic point of the periodic resonant current;
    determining a zero crossing of the resonant current as the specific periodic point;
    switching the inverter to a power forward state and to a power backward state at a predefined first time period before the zero crossing;
    switching the inverter to the free-wheeling switching state at a predefined second time period after the zero crossing, wherein the predefined second time period is a different time period than the predefined first time period; and
    applying a plurality of the switching states during a low-power mode such that an overall power feed backward from the resonant circuit to an input of the inverter is balanced with an overall power feed forward from the input of the inverter to the resonant circuit.

* * * * *